March 18, 1924.
A. J. HALL ET AL
1,486,882
SYSTEM OF CONTROL
Filed June 9, 1920   4 Sheets-Sheet 3
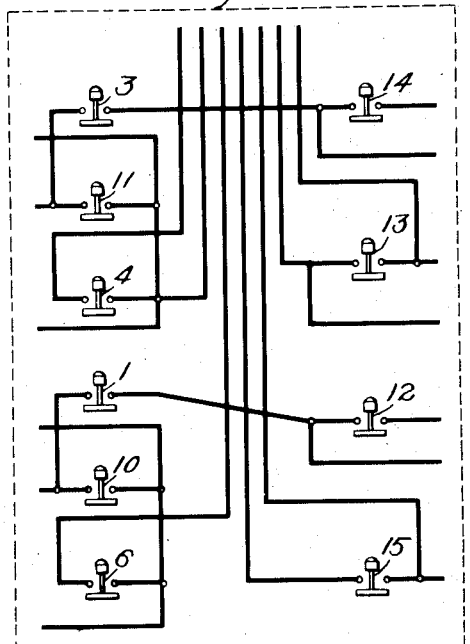
Fig. 5.
Cam Group #2.
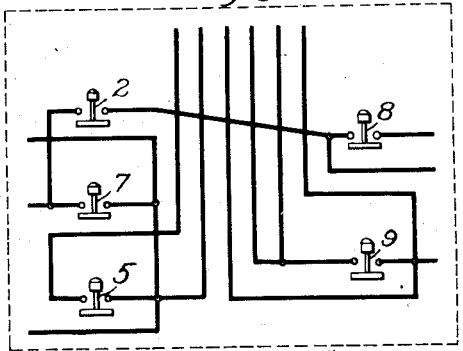
Fig. 6.
Cam Group #1.
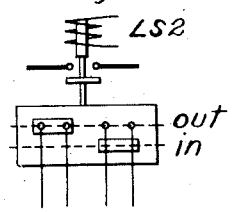
Fig. 7.
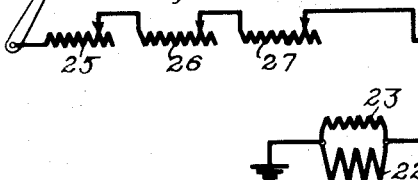
Fig. 8.   Acceleration-Series.
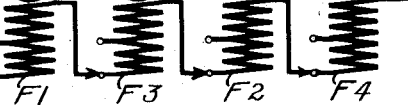
Fig. 9.   Acceleration-Series-Parallel
WITNESSES:
J. A. Helsel.
W. R. Coley
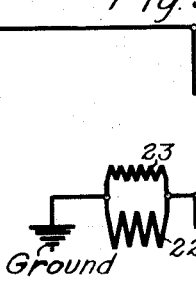
INVENTORS
Arthur J. Hall,
John A. Clarke, Jr.
Paul L. Mardis.
BY
Wesley G. Carr
ATTORNEY
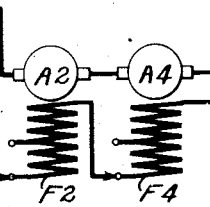

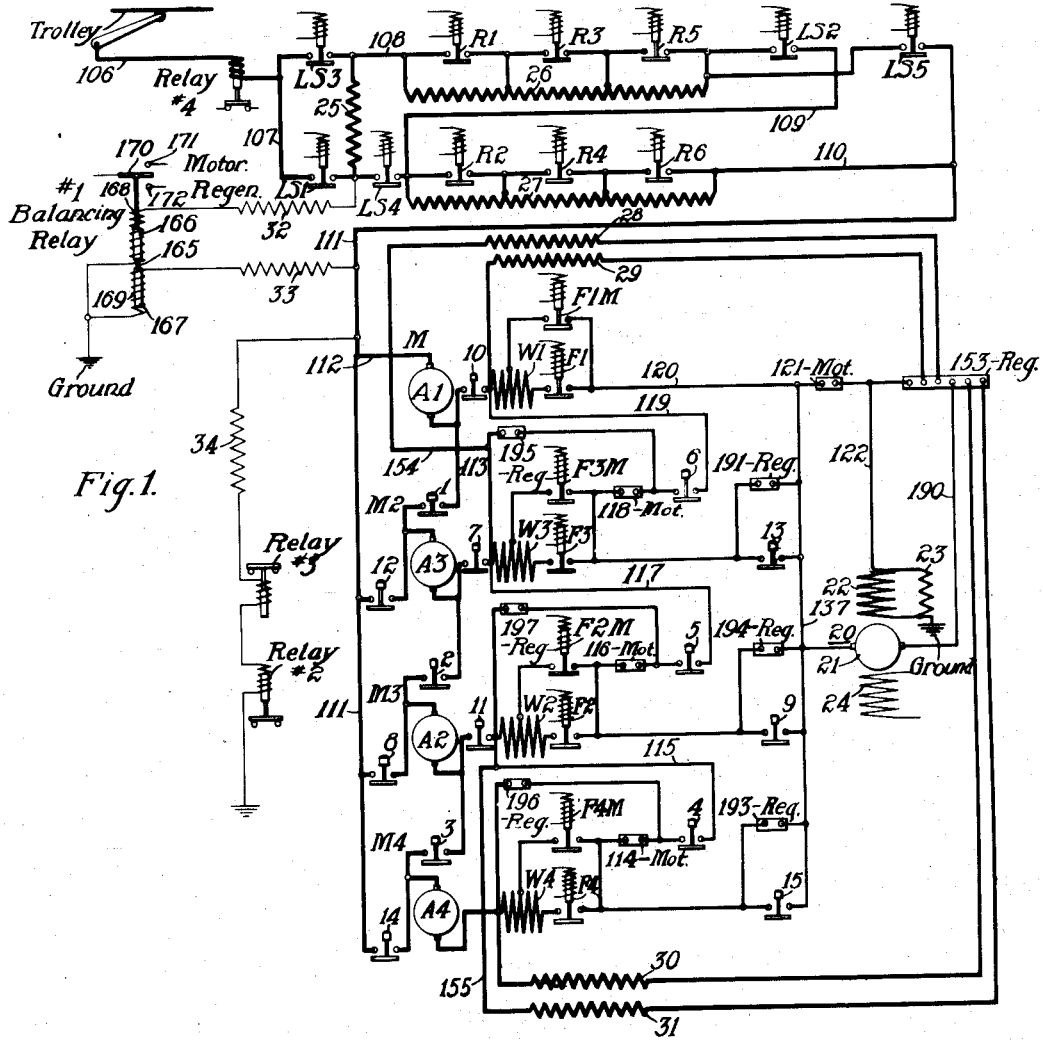

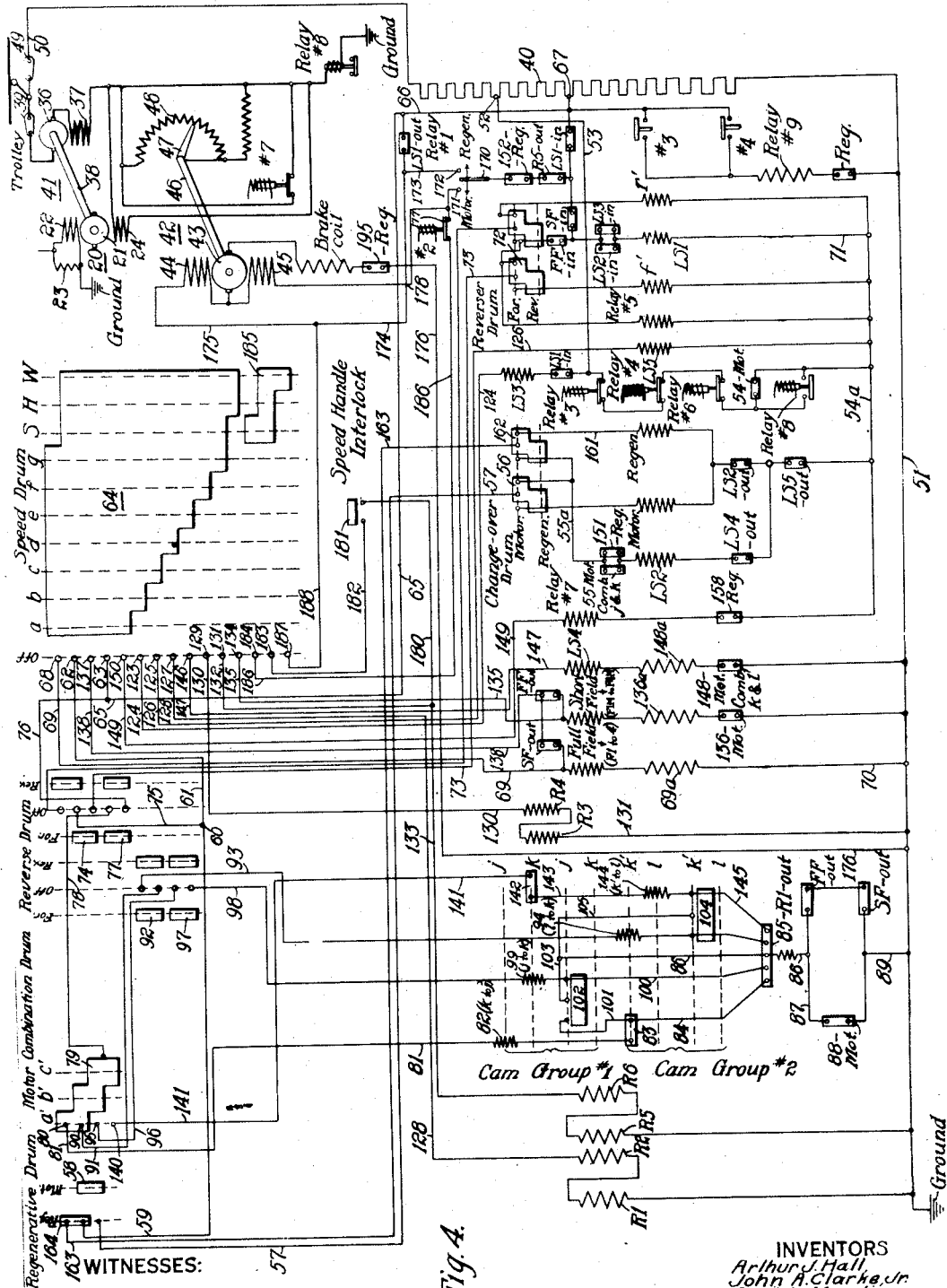

March 18, 1924.
A. J. HALL ET AL
1,486,882
SYSTEM OF CONTROL
Filed June 9, 1920  4 Sheets-Sheet 4
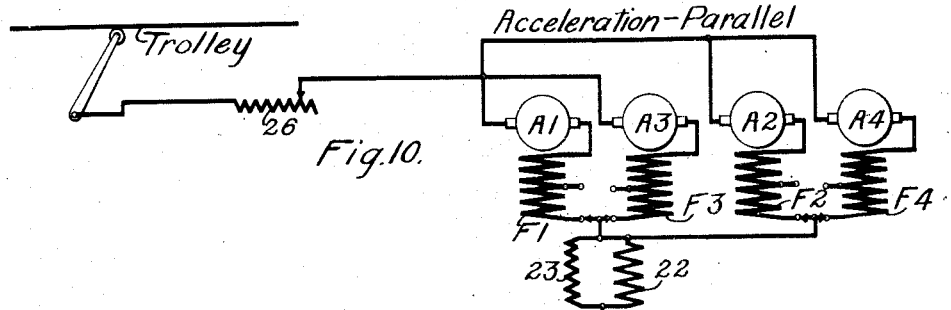
Fig. 10. Acceleration-Parallel
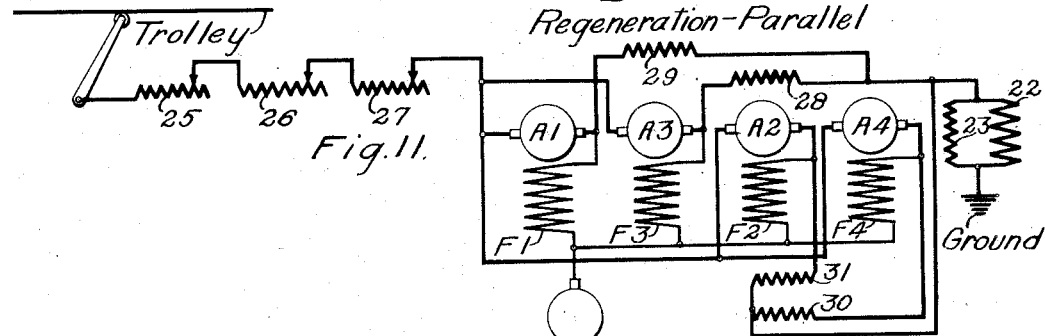
Fig. 11. Regeneration-Parallel
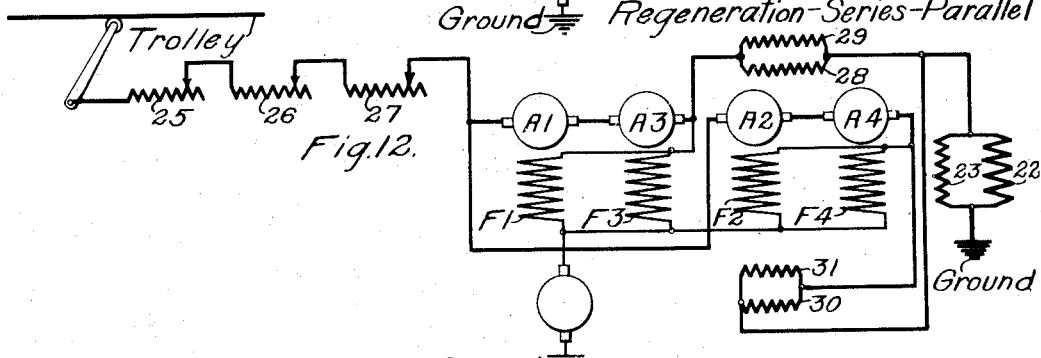
Fig. 12. Regeneration-Series-Parallel
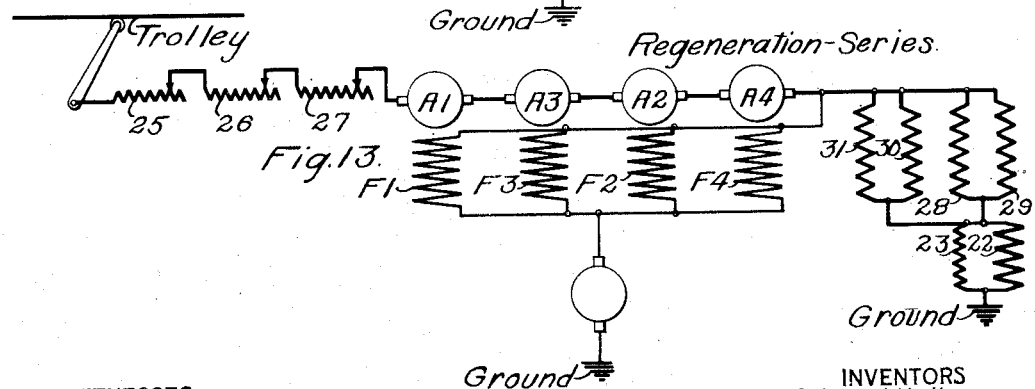
Fig. 13. Regeneration-Series
WITNESSES:
H. J. Shelhamer
W. R. Coley
INVENTORS
Arthur J. Hall,
John A. Clarke, Jr.
Paul L. Mardis.
BY
Wesley G. Carr
ATTORNEY Patented Mar. 18, 1924.

1,486,882

UNITED STATES PATENT OFFICE.

ARTHUR JOHN HALL, OF WINCHCOMBE, ENGLAND, AND JOHN A. CLARKE, JR., OF EDGEWOOD PARK, AND PAUL L. MARDIS, OF SWISSVALE, PENNSYLVANIA, ASSIGNORS TO WESTINGHOUSE ELECTRIC & MANUFACTURING COMPANY, A CORPORATION OF PENNSYLVANIA.

SYSTEM OF CONTROL.

Application filed June 9, 1920. Serial No. 387,558.

*To all whom it may concern:*

Be it known that we, ARTHUR J. HALL, a subject of the King of Great Britain, and a resident of Winchcombe, England; JOHN A. CLARKE, Jr., a citizen of the United States, and a resident of Edgewood Park, in the county of Allegheny and State of Pennsylvania; and PAUL L. MARDIS, a citizen of the United States, and a resident of Swissvale, in the county of Allegheny and State of Pennsylvania, have invented a new and useful Improvement in Systems of Control, of which the following is a specification.

Our invention relates to systems of control and it has special relation to the control of electric railway motors, and the like, during both motoring and regenerative periods.

The object of our invention, generally stated, is to provide a relatively simple and reliable system of control for an electric locomotive, or the like, which shall embody various features that are adapted to increase the efficiency or reliability of operation or to protect certain phases of the system under predetermined operating conditions.

Other and more specific objects of our invention will become evident from the following detailed description, taken in conjunction with the accompanying drawings, wherein—

Figure 1 is a diagrammatic view of the main circuits of a system of control organized in accordance with our present invention, together with certain auxiliary or relay circuits for purposes to be set forth;

Fig. 2 is a sequence chart of well-known form, indicating the preferred order of operation of the electrically-governed switches that are shown in Fig. 1;

Fig. 3 is a similar sequence chart, indicating the preferred order of operation of the remaining or cam-operated switches that are shown in Fig. 1;

Fig. 4 is a diagrammatic view of the auxiliary or governing circuits that are employed for carrying out our invention;

Fig. 5 and Fig. 6 are diagrammatic views illustrating the combinations or sets of switches contained in the respective cam groups;

Fig. 7 is a detail diagrammatic view of a complete "unit switch," including interlocking contact members, as employed in our invention; and Fig. 8 to Fig. 13, inclusive, are simplified diagrammatic views of the main circuits that are set up during various stages of machine operation, as indicated by the respective accompanying legends, such as "Acceleration-series," and "Regeneration-parallel."

Referring to Fig. 1 of the drawings, the main circuits here shown comprise suitable supply-circuit conductors respectively marked "Trolley" and "Ground"; a plurality of direct-current motors M1 to M4, inclusive, that are respectively provided with commutator-type armatures A1 to A4, inclusive, and series field windings W1 to W4, inclusive; a plurality of preferably electro-pneumatically actuated switches LS1, LS2, LS3, LS4, LS5, R1 to R6, inclusive, F1 to F4, inclusive, represented in Figs. 2 and 4 by the character FF, and F1M to F4M, inclusive, represented by the character SF; a plurality of cam-operated switches 1 to 15, inclusive; an exciter or auxiliary generator 20 having a commutator-type armature 21, a field winding 22 that is shunted by a resistor 23 and which is connected in series relation with the main machines, and a shunt field winding 24; a plurality of accelerating resistors 25, 26 and 27; a plurality of stabilizing or balancing resistors 28 to 31, inclusive, that are employed during regeneration; a plurality of auxiliary resistors 32 and 33 which are associated with relay #1, which may be termed the balancing relay; another auxiliary resistor 34, which is associated with relays #3 and #2, which may be designated as the over-voltage trip relay and the excess voltage relay; another relay device #4, which may be called the overload trip relay; and a plurality of contact segments or interlocks bearing the legend "Mot." or the legend "Reg.", reference being had to motoring and regenerative operation, respectively.

The various switches noted in the sequence chart, Fig. 2, may be of the familiar electrically-controlled, pneumatically-actuated type, and certain of the switches are provided with auxiliary contact members or interlocks, as diagrammatically illustrated in Fig. 7, in accordance with a well-known practice.

The remaining switches, as denoted in Fig. 3, are preferably of the familiar cam-operated type, wherein the movable contact members are actuated by a series of cams that are rigidly secured to an operating shaft. By actuating the shaft in the one or the other direction, by means of solenoids, or, preferably, by electrically-controlled valves for governing the admission of fluid pressure to operating cylinders, the cam shaft may be rotated to effect the desired closure of switches. Since the structure just outlined is well-known in the art and, moreover, since it is not essential to the success of our present invention, we have not deemed it necessary to further illustrate and describe the structure in question. However, Figs. 5 and 6 illustrate the preferred grouping of the cam-operated switches, whereby it will be seen that two sets or groups, respectively designated as cam group #1 and cam group #2, are employed in connection with the present invention. Movements of the switches in these groups are electrically governed from a primary or master controller, as hereinafter more fully set forth.

The various contact segments denoted by the legends Mot. and Reg. are located in the respectively corresponding positions of a familiar two-position drum-type controller which it is not considered necessary to illustrate here. This controller is again electrically or preferably electro-pnuematically actuated in the one or the other direction to throw the control drum into either its motoring or its regenerative position.

As previously stated and as indicated in the last two columns of the sequence chart, Fig. 2, the designation SF corresponds to the four short or normal field switches F1M to F4M, while the reference character FF corresponds to the full field switches F1 to F4, inclusive.

Referring to Fig. 4, the auxiliary governing system here shown comprises the supply-circuit conductors Trolley and Ground; a control resistor 40 of a familiar form for supplying a suitably low operating voltage to the actuating coils of the various illustrated switches, relays and other control devices; a motor-generator set 41 that is driven from the supply circuit to provide exciting energy to the main field windings during the regenerative period; a pilot-motor-operated rheostat 42 for governing the excitation of the generator 20; and a plurality of primary or master controlling devices that are grouped in a master controller and are respectively designated as "motor combination drum", "speed drum", "reverse drum" and "regenerative drum".

In addition to the relay devices #1 to #4, inclusive, that are shown in Fig. 1, and the contact members of which are included in various auxiliary circuits in Fig. 4, a plurality of other relay devices #5 to #9, inclusive, are provided for the purposes designated below.

*Function of relays.*

Relay #1—balancing relay—with accelerating resistors in circuit, this relay controls the field rheostat 42 for the exciter 20 to automatically weaken the flux produced by the field winding 24 if the main machines are regenerating and to strengthen the field flux if the main machines are motoring. In this way, the voltage generated by the momentum-driven machines during a coasting period is balanced against the concurrent supply-circuit voltage and operating conditions are maintained suitable for connecting the main machines to the supply circuit to effect regenerative operation.

Relay #2—excess voltage relay—prevents strengthening of the main field fluxes under excess voltage conditions of the regenerating machines.

Relay #3—over-voltage trip relay—opens line switches and applies air brakes if the regenerated voltage exceeds the setting of relay #2 by a predetermined value, such as 100 volts.

Relay #4—overload trip relay—opens line switches upon the occurrence of an overload current, and, if operated during the regenerative period, also applies the air brakes.

Relay #5—brake cylinder cutout relay—prevents application of the locomotive air-brakes whenever current flows in the main machines. The undesirability of concurrent regenerative and air-braking upon a locomotive, by reason of the mutual counteracting effect, is well known to those skilled in the art.

Relay #6—emergency brake relay—upon the occurrence of an emergency brake pipe pressure reduction, opens the line switches and permits brake application on the locomotive.

Relay #7—exciter field relay—nullifies the field flux of the winding 24 for the exciter 20 both under motoring conditions and while the line switches are open during the preliminary regenerative connections.

Relay #8—motor generator set relay—prevents closure of the line switches during regeneration unless the motor generator set is operating.

Relay #9—brake application valve relay—effects the application of the locomotive air-brakes whenever either the over-voltage trip relay #3 or the overload trip relay #4 has been actuated to open the line switches and thus eliminate the regenerative braking action.

Since the electric control of valves in connection with air-braking systems is, in general, well known, it is not believed to be necessary, for the purposes of the present invention, to illustrate or describe such structures and their operation. The designations applied to relay devices #5, #6 and #9 are considered to be sufficient to clearly set forth the functions performed by these relays.

The motor combination drum, in the master controller, normally occupies a position $a'$, corresponding to series connection of the main machines, and is provided with successive operative positions $b'$ and $c'$ that respectively correspond to series-parallel and to parallel connection of the machines.

The cam groups #1 and #2, which are controlled by the motor combination drum, are provided with two actuating coils each, that respectively correspond to forward and backward movement of the cam shaft. For example, the actuating coil of cam group #1 for effecting forward movement from position $j$ to position $k$, that is, from series to series-parallel position of the motors, is designated as 99 ($j$ to $k$), while the other actuating coil bears the reference character 82 ($k$ to $j$). The other cam group #2, initially occupies a position $k'$ and may be actuated in a similar way to position $l$. The two actuating coils provided for cam group #2 are designated as 144 ($k'$ to $l$) and 94 ($l$ to $k'$). Position $l$ corresponds to full parallel relation of the motors.

The general operation of the cam groups may be set forth as follows. Normally, cam group #1 occupies position $j$ corresponding to position $a'$ of the motor combination drum and to series connection of the motors, whereby switches 2 and 5 are closed, as indicated in step $a'$ of the sequence chart, Fig. 3. On the other hand, cam group #2 normally occupies its position $k'$ and effects the closure of switches 1, 3, 4 and 6.

Upon movement of the cam group #1 to position $k$ corresponding to series-parallel relation of the motors, three new switches 7, 8 and 9 are closed, while switches 2 and 5 are opened. The cam group #1 then remains in position $k$, and, for parallel operation of the motors, the cam group #2 is actuated to position $l$, whereby switches 10 to 15, inclusive, are closed, while switches 1, 3, 4 and 6 are opened, as indicated in the sequence chart, Fig. 3, position $c'$.

The speed drum normally occupies its "Off" position and is provided with a plurality of operative positions $a$ to $g$, inclusive, corresponding to the gradual exclusion of the accelerating resistors from circuit, as indicated in the sequence chart, Fig. 2, and further positions S, H and W, respectively standing for Strengthen, Hold and Weaken, reference being had to the control of the pilot-motor-operated rheostat 42 and, therefore, to the strength of the exciter field winding 24 during the regenerative period of the main machines, while the position H is also employed during motoring conditions to effect the closure of the short field switches F1M to F4M.

The reverse drum is adapted to occupy the customary positions "Off", "For." and "Rev.", the latter two respectively corresponding to Forward and Reverse directions of operation of the main machine. The reverse drum, in accordance with the well-known practice, is adapted to govern the actuating coils $f'$ and $r'$ to actuate the familiar drum-type reverser to the one or the other of its operative positions and thus reverse the relative connections of the respective armatures and field windings of the main machines. Since this structure is old in the art and is not essential to carrying out the present invention, we have not deemed it necessary to further illustrate or describe the device, which has been omitted entirely from Fig. 1 for the sake of simplicity and clearness.

The regenerative drum is of the familiar two-position type for governing the actuating coils marked "Motor." and "Regen." of a drum device similar to the well-known pneumatically-actuated main-circuit reverser. In this way, the main circuits may be prepared for preliminary regenerative or motoring connections.

The motor-generator set 41 comprises a driving motor armature 36 and a series field winding 37 therefor, the driving motor being connected through a suitable hand-switch 39 and the actuating coil of the motor-generator set relay #8 across the supply-circuit conductors Trolley and Ground.

The exciter armature 21 is mechanically coupled with the motor armature 36 by means of a shaft 38, for example. The exciting field winding 22 is connected in series relation with the main machines, as hereinafter traced in detail, while the other field winding 24 is energized in accordance with the movements of the pilot-motor-operated rheostat 42.

The rheostat 42 comprises a commutator-type armature 43 and a series field winding that is divided into two parts 44 and 45, which are oppositely connected with respect to the armature 43 and thus effect rotation of the armature in the one or in the other direction, in accordance with the field-winding section that is selectively energized at the time.

The pilot-motor armature 43 is connected, through a shaft 46, to a movable switch arm 47 which plays over a face-plate rheostat including a resistor 48. Thus, movement of the pilot motor in the one or in the other direction serves to strengthen or weaken the flux emitted by the exciter field winding 24, such strengthening or weakening action corresponding to positions S and W of the speed drum, as previously mentioned.

Assuming that it is desired to effect motoring or acceleration of the main machines, the motor-generator set 41 need not be operated unless the vehicle-lighting circuits or other auxiliaries are to be energized from the generator 20. However, a switch 49 is closed to establish a circuit from the Trolley through the switch, conductor 50, control resistor 40 and negative conductor 51 to Ground.

With the regenerative drum occupying its position "Mot.," and the reverse drum its position "For.," the motor combination drum may remain in its initial positon $a'$ while the speed drum is actuated to its initial operative position $a$.

Under such conditions, a circuit is established from the intermediate tap-point 52 of the control resistor 40 through conductor 53, contact members of the over-voltage trip relay 3, the overload trip relay 4 and the emergency brake relay 6, in their lower or normal positions, contact segment 54—Mot. of the changeover drum controller that is governed by the regenerative drum, conductor 54a, interlocks LS5—out and LS4—out, actuating coil of the switch LS2, contact segment 55—Mot. Comb. $j$ and $k$, whereby the switch LS2 may be closed only when the cam group #1 occupies its position $j$ or position $k$ to effect series or series-parallel operation of the motors, whence circuit is continued through conductor 55a, contact segment 56 of the changeover drum in its motoring position, conductor 57, contact segment 58 of the regenerative drum in its position "Mot.," conductor 59, junction-point 60, where the circuit divides, one branch including conductor 61, control fingers 62 and 63, which are bridged by contact segment 64 of the speed drum, conductors 65 and 66, to a second intermediate tap-point 67 of the control resistor 40. The switch LS2 is thus initially closed.

Another circuit is established from the contact segment 64 of the speed drum through control finger 68, conductor 69, actuating coil marked "Full field", corresponding to the actuating coils of the switches F1 to F4, inclusive, resistor 69a and conductor 70 to the negative conductor 51.

Upon the closure of the switch LS2 and the full field switches, another circuit is established from the conductor 54a through conductor 71, actuating coil of the switch LS1, interlocks LS2—in and FF—in, contact segment 72 of the main reverser drum in its "Forward" position, conductor 73, contact segment 74 of the reverse drum in its "Forward" position, and conductor 75 to the junction-point 60, whence circuit is completed as previously traced.

The switches LS1, LS2 and the full field switches are thus closed, as indicated in the sequence chart, Fig. 2. In addition, the cam-operated switches 1 to 6, inclusive, are initially closed, as indicated in the initial line $a'$, corresponding to position $a'$ of the motor combination drum, in the sequence chart, Fig. 3.

Referring temporarily to Fig. 1, the main circuits established by the closure of these switches may be traced as follows: from the trolley through conductor 106, actuating coil of the overload trip relay #4, conductor 107, switch LS1, accelerating resistor 25, conductor 108, accelerating resistor 26, switch LS2, conductor 109, accelerating resistor 27, conductors 110, 111 and 112, armature A1, conductor 113, switch 1, armature A3, switch 2, armature A2, switch 3, armature A4, the entire field winding W4, switch F4, contact segment 114—Mot. of the change-over drum, switch 4, conductor 115, field winding W2, switch F2, contact segment 116—Mot., switch 5, conductor 117, field winding W3, switch F3, contact segment 118—Mot., switch 6, conductor 119, field winding W1, switch F1, conductor 120, contact segment 121—Mot., conductor 122 and the parallel-related field winding 22 for the exciter 20 and resistor 23, whence circuit is completed to the negative conductor Ground.

In this way, the motors are initially connected in series relation with the accelerating resistors 25, 26 and 27 across the supply-circuit conductors Trolley and Ground. The simplified connections for series acceleration are shown in Fig. 8.

Upon movement of the speed drum to its second operative position $b$, another circuit is established from the contact segment 64 thereof through control finger 123, conductor 124, actuating coil of the switch LS3, interlock LS1—in and thence through conductor 53 to the intermediate tap-point 52 of the control resistor 40. The switch LS3 is thus closed to short-circuit the accelerating resistor 25 in conjunction with the already closed switch LS1.

Position $c$ of the speed drum is effective to close the switch LS5 by reason of the completion of a new circuit from contact segment 64 through control finger 125, conductor 126 and the actuating coil of the switch LS5 to the supply conductor 54a. The resistor 27 is thus short-circuited. The opening of switch LS2, by reason of the exclusion of interlock LS5—out from its energizing circuit, does not affect the main-circuit resistance value.

The next control step occurs when the speed drum is moved to its position $d$ whereby contact segment 64 engages control finger 127, whence circuit is continued through conductor 128, the series-related actuating coils of the switches R2 and R1 and thence to the negative supply conductor Ground. It will be noted that the actuating coils just mentioned are connected in series relation in view of the fact that they are energized from a relatively long or double-voltage section of the control resistor between the intermediate tap-point 67 and the negative or grounded terminal. The closure of switch R1 thus short-circuits a portion of the accelerating resistor 26.

Position e of the speed drum is effective during series-parallel and parallel operation of the motors only, and, consequently, no further control step is effected until the speed drum is moved to its position f. At this time, contact segment 64 engages control finger 129, whence circuit is completed through conductor 130, the series-related actuating coils of the switches R4 and R3 and conductor 131 to the negative conductor 51. Another portion of the resistor 26 is thus short-circuited, by the switch R3.

In the succeeding position g of the speed drum, control finger 131 comes into engagement with the contact segment 64, circuit being continued through conductors 132 and 133 to the series-related actuating coils of the switches R6 and R5. The final section of the resistor 26 is excluded from circuit by the switch R5.

In this way, the various resistor-short-circuiting switches are closed to effect a gradual exclusion from circuit of the accelerating resistors 25, 26 and 27, whereby the motors are connected in straight series relation.

Upon actuating the speed drum from position g to position S, the control finger 68 becomes disengaged from the contact segment 64. However, the actuating coils of the corresponding switches, namely, the full field switches F1 to F4, inclusive, are not de-energized by reason of the fact that another control finger 137 also engages the contact segment 64 throughout the range of travel thereof, and a circuit is established from the control finger 137 through conductor 138, interlock SF—out, which is closed whenever the short field switches F1M to F4M are open, connection being made from the interlock SF—out to the actuating coils for the full field switches.

The purpose of this transfer of connections will become evident from the following description. Upon movement of the speed drum to its succeeding position H, contact segment 64 engages control finger 134, whence circuit is continued through conductor 135, the actuating coils of the short field switches F1M to F4M, resistor 136a, contact segment 136—Mot. of the change-over drum, and thence to the negative conductor 51.

As soon as the short field switches have closed, the interlock SF—out is excluded from circuit to effect de-energization of the actuating coils for the full field switches. In this way, the closure of the short field switches is ensured before the opening of the full field switches, and the converse statement holds true by reason of the provision of the interlock FF—out between conductor 138 and the short field coils, as will be understood.

Although the interlock FF—in is removed from the circuit of the actuating coil for the line switch LS1, the switch is maintained closed during the field-connection change just described by reason of the formation of a holding circuit from the tap-point 67 of the control resistor 40 through interlocks LS1—in, SF—in and LS3—in to the actuating coil of the switch LS1.

The closure of the short field switches to exclude a portion of each of the main field windings W1 to W4, inclusive, from circuit serves to effect another increase in the accelerating speed of the main motors, in accordance with familiar principles.

To effect transition of the motors to series-parallel relation, the speed drum is returned to its third position c, preferably after the motor combination drum is actuated to its second position b'. In this way, the accelerating resistor 26 is re-connected in circuit before the transition is accomplished, but a closed circuit or continuous-torque type of transition is effected, by reason of the fact that the speed drum is not returned to its "Off" position.

Under the conditions noted, a new circuit is established from the contact segment 64 of the speed drum through control finger 63, conductor 76, contact segment 77 of the reverse drum in its "Forward" position, conductor 78, contact segment 79 of the motor combination drum in its position b', control finger 95, conductor 96, contact segment 97 of the reverse drum in its "Forward" position, conductor 98, actuating coil 99 (j to k) of cam group #1, conductor 100, interlock 85—R1—out (thus ensuring the insertion of a properly high amount of resistance in circuit) conductors 86 and 87, contact segment 88—Mot. of the changeover drum and conductor 89 to the negative conductor 51. The cam group #1 is thus actuated to its position k, after the return movement of the speed drum has effected the opening of the resistor-short-circuiting switch R1. Such movement effects the opening and closure of switches that are indicated in Fig. 3, in the three transition positions between steps a' and b'. It will be seen, from the sequence chart, that the switch 7 is closed and the switches 2 and 5 are then opened. Finally, the switches 8 and 9 are closed. All of these switches, as illustrated in Fig. 6 are contained in cam group #1.

In this way, a suitably high amount of protective resistance is inserted in the main circuit, but not too high to cause rough transition. Thus a smooth and rapid transition of the motors may be effected.

At this period, therefore, the motor combination drum occupies its position $b'$ and the speed drum its position $c$. Referring temporarily to Fig. 1, the main circuits at this time may be traced from the trolley through the accelerating resistor 26, as previously set forth, whence circuit is continued through conductors 111 and 112, armature A1, conductor 113, switch 1, armature A3, switch 7, field winding W3, switch F3, contact segment 118—Mot., switch 6, conductor 119, field winding W1, switch F1, conductor 120, contact segment 121—Mot. and thence through conductor 122 to Ground, as previously traced.

A concurrent circuit is established from the conductor 111 through switch 8, armature A2, switch 3, armature A4, field winding W4, switch F4, contact segment 114—Mot., switch 4 conductor 115, field winding W2, switches F2 and 9 and thence through conductor 137 and contact segment 121—Mot. to Ground as already set forth. In this way, the pairs of motors A1 and A3 and A2 and A4 are connected in series-parallel relation, all of the accelerating resistor 26 being connected in series relation with the series-parallel-related motors.

The simplified circuit connections for series-parallel acceleration are shown in Fig. 9.

Movement of the speed drum through its successive positions again closes the various resistor-short-circuiting switches, as described in connection with series operation of the motors, and, in addition, switch LS4 may be operated, since the cam group #1 occupies its position $k$, thus completing the circuit for the corresponding actuating coil through contact segment 148.

Thus, in position $e$ of the speed drum, contact segment 64 engages control finger 146, whence circuit is completed through conductor 147, actuating coil of the switch LS4, resistor 148*, contact segment 148—Mot. Comb. $k$ and $l$ and thence to the negative conductor 51. The concurrent closure of switches LS4 and LS5 thus places the accelerating resistors 26 and 27 in parallel relation. The total resistance in the circuit of the motors during series-parallel acceleration in thus less than that employed for the corresponding steps during series acceleration, as desirable for smooth operation.

As stated above, the remaining steps of control as governed by the speed drum are similar to those set forth in connection with series acceleration and again the short-field connections may be established by actuating the speed drum to its position H.

To effect transition of the motors to parallel relation, the motor combination drum is first moved to its third position $c'$ and the speed drum may be then returned to its position $c$ to re-insert the resistor 26 in circuit. The other accelerating resistors 25 and 27 are inactive at this time, by reason of the concurrent closure of switches LS1, LS3 and LS5.

In position $c'$ of the motor combination drum, a new circuit is established from the contact segment 79 thereof through control finger 140, conductor 141, interlock 142, in position $k$ of the cam group #1, conductor 143, actuating coil 144 ($k'$ to $l$), conductor 145, interlock 85—R1—out and thence through conductor 86 to negative conductor 51, as previously traced. The cam group #2 is thus actuated to its position $l$, after the resistor short-circuiting switch R1 has been opened, to effect the transitional operation indicated in the steps between positions $b'$ and $c'$ in the sequence chart, Fig. 3. These steps consist in the closure of switches 10 and 11, the opening of switches 1, 3, 4 and 6 and the closure of switches 12, 13, 14 and 15. In position $l$ of the cam group #2, therefore, corresponding to position $c'$ of the motor combination drum, switches 7 to 15, inclusive, are closed. It will be noted that all of the switches mentioned are contained in cam group #2, as indicated in Fig. 5.

Referring temporarily to Fig. 1, the main circuits completed at this time may be traced from the accelerating resistor 26 through conductor 111, where the circuit divides, one branch including conductor 112, armature A1, switch 10, field winding W1, full field switch F1 and conductor 120 to contact segment 121—Mot. A second branch is continued from the conductor 111 through switch 12, armature A3, switch 7, field winding W3, switches F3 and 13, and conductor 137 to the contact segment 121—Mot. A third branch circuit is continued from the conductor 111 through switch 8, armature A2, switch 11, field winding W2 and switches F2 and 9 to the conductor 137, while a fourth branch circuit is completed from the conductor 111, through switch 14, armature A4, field winding W4, switches F4 and 15 to the conductor 137. A common circuit is continued from the contact segment 121—Mot. through conductor 122 to Ground, as previously traced. The four motors M1 to M4, inclusive, are thus connected in parallel relation, the accelerating resistor 26 being connected in series relation with the several motors, as indicated in a simplified form in the diagram, Fig. 10.

Movements of the speed drum through its successive positions effect gradual short-circuit of the accelerating resistors in accordance with the previously-mentioned procedure, and actuation of the speed drum to its position H again effects the closure of the short field switches and the opening of the full field switches in the manner already set forth. At this time, therefore, the four motors are connected in full parallel relation across the supply circuit.

Assuming that it is desired to effect regenerative operation of the momentum-driven machines at a speed sufficiently high to permit parallel operation of the machines, the speed drum is returned to its "Off" position to open the line switches, thereby disconnecting the machines from the supply circuit, while the motor combination drum is allowed to remain in its position $c'$. It will be understood that, in case the speed has decreased to a certain degree before regenerative action is attempted, the motor combination drum in that case will be moved to its position $b'$ to balance the voltage of the series-parallel-related motors against that of the supply circuit. In the event of a relatively low vehicle speed, when regeneration is attempted, the motor combination drum will be actuated to its initial position $a'$ to effect series connection of the motors and, in that case, therefore, the sum of all their voltages will be balanced against that of the line.

It will be understood that, unless the motor-generator set 41 is already running, it will be necessary to start it into operation by the closure of the switch 39, or otherwise, before regenerative operation of the main machines, requiring separate excitation of the main field windings from the motor-generator set, can be effected.

With the motor combination drum, therefore, in position $c'$, the reverse drum in its "Forward" position and the speed drum in its "Off" position, the regenerative drum may be actuated to its position "Reg." and the speed drum may be moved to its initial operative position $a$. Under such conditions, a circuit is established from the intermediate tap-point 52 of the control resistor 40 through conductor 53, the contact members of over-voltage trip relay #3, of over-load trip relay #4 and of emergency brake relay #6 in their lower positions, whence circuit is continued to contact members of motor-generator set relay #8, in its upper position, thereby ensuring that the motor-generator set is properly functioning, conductor 54a, interlocks LS5—out and LS2—out, actuating coil Regen. of the changeover drum, conductor 161, contact segment 162 of the changeover drum in its "Motor." position, conductor 163, contact segment 164 of the regenerative drum in its position "Reg.", conductors 59 and 61, control finger 62, contact segment 64 of the speed drum and thence to the second intermediate tap-point 67 of the control resistor 40, as previously described.

Furthermore, a new circuit is established at this time from the contact segment 64 of the speed drum through control finger 150, conductor 149, actuating coil of the exciter field relay #7 and contact segment 158—Reg. to conductor 54a. The relay is thus lifted to permit energization of the exciter field winding 24.

As soon as the changeover drum has been thus actuated to its position "Regen." to remove from circuit the various contact segments designated by Mot. and to insert in circuit the several contact segments denoted by Reg., a further circuit is continued from the conductor 54a through interlocks LS5—out and LS4—out, the actuating coil of the switch LS2, contact segment 151—Reg. of the changeover drum, conductor 55a, contact segment 162 of the changeover drum, in its position "Regen.", whence circuit is continued through conductor 163, as already traced.

The full field switches are also initially energized by reason of the engagement of contact segment 64 with control finger 68 and in accordance with previously-traced circuits. With the closure of the full field switches and of the switch LS2, another circuit is established from the conductor 54a through conductor 71, actuating coil of the switch LS1, interlocks LS2—in and FF—in and thence to the intermediate tap-point 67, as already traced. The machines are thus connected in mutual parallel relation and in common series relation with the accelerating resistors 25, 26 and 27 across the supply circuit.

As soon as the above-mentioned switches have been closed to connect the machines to the supply circuit, the main-armature circuits that are established in the system illustrated in Fig. 1 may be traced as follows: from the accelerating resistors 25, 26 and 27 in series relation, through conductors 110 and 111, where the circuit divides, one branch including conductor 112, armature M1, switch 10, stabilizing resistor 29, contact segment 153—Reg. of the changeover drum and thence through conductor 122, field winding 22 for the exciter 20 and the parallel-related resistor 23 to Ground.

A branch circuit is continued from the conductor 111 through switch 12, armature A3, switch 7, conductor 154 and stabilizing resistor 28 to the contact segment 153—Reg.

A third branch circuit is completed from the conductor 111 through switch 8, armature A2, switch 11, conductor 155, stabilizing resistor 31 and contact segment 153—Reg. to Ground. A fourth branch circuit is continued from the conductor 111, through switch 14, armature A4 and stabilizing resistor 30 to the contact segment 153—Reg.

The initially closed field-winding or exciting circuits include the armature 21 of the exciter 20 as a common source of energy. From the positive terminal of the armature 21, a circuit is established through conductor 190, contact segment 153—Reg., stabilizing resistor 29, field winding W1, switch F1, conductors 120 and 137 and thence to the negative terminal of the exciter armature 21.

A branch circuit is continued from the contact segment 153—Reg. through stabilizing resistor 28, conductor 154, field winding W3, switch F3 and contact segment 191—Reg. to the negative conductor 137.

In a similar manner, the positive terminal of the exciter armature 21 is connected through conductor 190, contact segment 153—Reg., stabilizing resistor 30, field winding W4, switch F4 and contact segment 193—Reg. to conductor 137, while a branch circuit is completed from the contact segment 153—Reg. through stabilizing resistor 31, conductor 155, field winding W2, switch F2 and contact segment 194—Reg. to the negative conductor 137.

It will be thus be seen that the momentum-driven main armatures are connected in series relation with the corresponding stabilizing resistors, these series circuits being connected in mutual parallel relation and in common series relation with the several accelerating resistors across the supply circuit. On the other hand, the exciter armature 21 serves to energize the four field-winding circuits, the arrangement of parts being such that the exciter armature and each field winding are connected in shunt to the corresponding stabilizing resistor. The simplified connections for parallel regeneration are shown in Fig. 11.

The regenerative connections just described are not of our present invention, but are fully set forth and claimed in Patent No. 1,298,706, granted to Rudolf E. Hellmund, on April 1, 1919, and assigned to the Westinghouse Electric & Manufacturing Company. Since an exposition of the operation of this particular type of regenerative circuit is not essential to the present invention, we do not deem it necessary to make any such exposition.

With the armatures connected through the accelerating resistors to the supply circuit and with the field windings energized from the exciter armature 21, it will be noted that the voltage regenerated by the momentum-driven machines will be opposed to the concurrent voltage of the supply circuit, the difference in the one or the other direction being absorbed by the accelerating resistors 25, 26 and 27. The function of the balancing relay #1 is to substantially equalize these two voltages, or, in other words, maintain a substantially zero flow of current, and thus render conditions suitable for direct connection of the machines to the supply circuit. In general, the relay acts to strengthen or weaken the field winding 24 of the exciter 20 by effecting operation of the pilot motor-actuated rheostat 42 in the one or in the other direction, dependent upon whether the line voltage or the regenerative voltage is predominant at the time.

The energizing circuit connections of the balancing relay #1 are shown in Fig. 1, where it will be seen that the auxiliary resistor 32 is connected to a point intermediate the switches LS1 and LS4, the other end of the resistor being connected through an actuating coil 168 of the relay to Ground. This actuating coil thus corresponds to the line voltage. On the other hand, a second actuating coil 169 is connected from Ground through auxiliary resistor 33 to the higher-voltage terminal of the various main armatures, that is, to conductor 111. The coil 169 thus corresponds to the motor or regenerated voltage. The two coils 168 and 169 are adapted to act differentially upon suitable cores or plungers 166 and 167, respectively, that are mechanically joined by a rod or stem 165. One end of the plunger element is provided with a suitably insulated contact disk 170, which normally occupies the illustrated middle or neutral position and which is adapted to bridge stationary lower contact member 172 whenever the lower coil 169, corresponding to machine voltage and regenerated current, is predominant and to bridge a stationary upper contact member 171 whenever the upper coil 168 corresponding to line voltage and motoring current, is the stronger.

As soon as the switch LS1 is closed, a new circuit is established from the intermediate double-voltage tap-point 67 of the control resistor 40 through interlocks LS1—in and R5—out, contact segment 152—Reg. of the changeover drum and contact segment 170 of the balancing relay #1, whence circuit is continued through either stationary contact member 171 or contact member 172, dependent upon whether the line voltage or the regenerative voltage of the machines is predominant at the instant.

Assuming that the regenerated voltage is momentarily higher than the line voltage, contact is effected between conducting members 170 and 172, whence circuit is continued through conductors 173, 174 and 175, field-winding section 44 and armature 43 of the pilot motor, a brake-releasing coil for the pilot motor, contact segment 195—Reg. and conductor 176 to negative conductor 51. The pilot motor is thus actuated in such direction as to decrease the active amount of the resistor 48, thus reducing the excitation of the field winding 24 for the exciter 20. This decreased excitation in turn produces a reduced energization of the main field windings from the exciter 20, whereby the regenerated voltage is lowered to more nearly accord with the concurrent line voltage.

On the other hand, if the line voltage is greater than the regenerated voltage, as registered by the balancing relay #1, contact is then effected between the conducting members 170 and 171, whence circuit is continued through conductor 178, field-winding section 45 and armature 43 of the pilot motor and thence to Ground, as already traced. Consequently, the pilot motor is actuated in the opposite direction from that taken when the field-winding section 44 is energized, with the result that the energization of the main field windings from the exciter 20 is increased to cause the regenerated voltage to more nearly equal the line voltage.

In this way, the two voltages in question are automatically balanced one against the other as the speed drum is actuated through its successive positions $a$ to $g$, inclusive, to gradually exclude the accelerating resistors 25, 26 and 27 from circuit.

It should be noted that, by reason of the connection of the pilot motor to the double-voltage tap 67, a relatively high running speed of the rheostat 42 is obtained, whereby the various regenerative-control operations may be better governed.

After the accelerating resistors are excluded from circuit, the operator may, at will, strengthen, hold or weaken the main field excitation by employing the three positions S, H and W of the speed drum. Such manual action is required after the accelerating resistors have been cut out of circuit, since the interlock R5—out, that is connected in series relation with the contact disk 170 of the balancing relay #1, is then excluded from circuit to render the balancing relay inoperative.

For example, if it is desired to strengthen the main field excitation to increase the regenerative action of the machines, the speed drum may be moved to its position S, whereupon a circuit is established from the contact segment 64 through control finger 131, conductors 132 and 180, speed handle interlock 181, which is closed only when the handle of the speed drum is fully depressed by the operator whence circuit is continued through conductor 182, control fingers 183 and 184, which are bridged by the contact segment 185 of the speed drum in position S, conductor 186, contact disk 177 of the excess-voltage relay #2 and conductor 178 to the field-winding section 45 of the pilot motor. Consequently, the same regulating action of the pilot-motor-operated rheostat occurs as took place when the balancing relay #1 effected contact between the conducting members 170 and 171, as previously described. It will be noted, however, that manual over-strengthening of the main field flux is prevented by the interposition of the excess-voltage relay #2.

To weaken the main field flux and thus reduce the retarding or braking action of the momentum-driven machine, the speed drum may be actuated to its position W, whereby control fingers 183 and 187 are bridged by the contact segment 185, whence circuit is continued through conductor 188 to the field-winding section 44 of the pilot motor. The opposite regulating action of the pilot-motor-operated rheostat thus occurs, as is desirable to weaken or reduce the main field excitation.

To maintain any given degree of regenerative torque, it is merely necessary to actuate the speed drum to its position H, in which case neither of the field-winding sections of the pilot motor is energized. Consequently, the brake-releasing coil is likewise deenergized and the rheostat thus remains in its previous position until the speed drum is actuated to either its position S or its position W, at the will of the operator.

After the main field strength has been raised to its highest value and the speed of the momentum-driven machines has decreased to a point where the combined effects of such speed and such excitation is almost insufficient to maintain regenerative operation, the transition of the machines to the series-parallel combination to effect further regenerative operation may be accomplished by throwing the speed drum to its "Off" position and then actuating the motor combination drum to its position $b'$. Under such conditions, all of the line switches and also all field switches are opened and, consequently, an open-circuit type of transition is employed, thereby ensuring the absence of all circulating currents through the machines and a smooth transitional action.

In position $b'$ of the motor combination drum, contact segment 79 energizes control finger 90, whence circuit is continued through conductor 91, contact segment 92 of the reverse drum in its "Forward" position, conductor 93, actuating coil 94 ($l$ to $k'$) of the cam group #2, interlock 85—R1—out, conductor 86, interlocks FF—out and SF—out and conductor 89 to the negative conductor 51. The reverse transition from that effected when moving the motor combination drum from position $b'$ to position $c'$ is effected, the various switches following the order of operation that is indicated in the transition positions between steps $c'$ and $b'$ in the sequence chart, Fig. 3.

The balancing relay #1 will again come into play, as already described, as soon as the speed drum is actuated in a backward direction to its position *f*, whereupon the R5 switch opens. This action closes the gap in the balancing relay circuit between interlocks LS1—in and 152—Reg. by reason of the insertion of the interlock R5—out. This feature is also utilized when it is desired to gradually reduce the regenerative braking current (and torque) to zero, rather than eliminating it all at once, in order to give the most smooth action when handling a train. The engineer merely has to back off the speed drum handle to the "*f*" notch, whereupon the balancing relay will automatically weaken the field strength and reduce the armature current to zero. After elimination of the accelerating resistors, as previously set forth, the operator may manipulate the speed drum to its positions S, H and W, at will, to secure the desired degree of regenerative torque or retarding effort.

The simplified connections for series-parallel regeneration are shown in Fig. 12.

It will be observed that the stabilizing resistors 28 and 29 are connected in direct parallel relation, and the same holds true for the stabilizing resistors 30 and 31. This action is desirable in order to reduce the value of the resistance in circuit with the field windings during the lower-speed or series-parallel combination. Such parallel connection of the stabilizing resistors is effected through the agency of contact segment (see Fig. 1) 195—Reg. in conjunction with switch 6 and contact segment 196—Reg. in conjunction with switch 4, as will be evident from an inspection of the drawing.

When the machine speed has dropped to a point where series-parallel regeneration is no longer practicable, the operator may effect transition of the machines to series relation by returning the speed drum to its "Off" position and then actuating the motor combination drum to its initial position *a'*. The desired transition, which is brought about in this manner, is again of the open-circuit type.

Under such conditions, the contact segment 79 of the motor combination drum engages control finger 80, whence circuit is continued through conductor 81, actuating coil 82 (*k* to *j*) of the cam group #1, contact segment 83 of the cam group #2 in its position *k'*, conductor 84, interlock 85—R1—out and thence to the negative conductor 51, as previously traced. The reverse transition from that previously described as effected by moving the motor combination drum from position *a'* to position *b'* is thus produced and may be followed from the sequence chart, Fig. 8.

Further regenerative operation may then be accomplished in a manner similar to those previously set forth by actuating the speed drum through its positions *a* to *g*, inclusive, during which period the balancing relay #1 is operative, and then to the positions S, H and W for securing the desired degree of braking effort, as will be understood.

The main-circuit connections for series regeneration are shown in a simplified manner in Fig. 13. It will be noted from Fig. 13 that all of the stabilizing resistors 28 to 31, inclusive, are connected in direct parallel relation, whereby the effective value of resistance in circuit with the main field windings is desirably reduced for the lowest-speed or series combination of the machines. This parallel connection is completed, as shown in Fig. 1, through the agency of contact segment 197—Reg. acting in conjunction with switch 5, in addition to the previously-mentioned contact segments 195—Reg. and 196—Reg., as will be understood without detailed tracing of the circuits.

It should be noted that the position H, which was used during motoring or accelerating operation of the machines for effecting the closure of the short field switches, is employed during regenerative operation for maintaining any desired degree of retarding effort. The short field switches F1M to F4M are not closed during the regenerative period by reason of the exclusion from the energizing circuit of their actuating coils of the contact segment 136—Mot. of the change-over drum.

To ensure that the field rheostat 42 normally occupies its extreme field-weakening position, that is, the position corresponding to a minimum potentially active amount of the resistor 48, a circuit is established, whenever the speed drum is returned to its "Off" position, as just prior to a transition of the machines during the regenerative period, from the tap-point 67 of the control resistor 40 through conductor 66, interlock LS1—out and conductors 174 and 175 to the pilot-motor field-winding section 44, whereby the desired movement of the rheostat 42 is automatically effected when the line switch LS1 is opened.

The purpose of the contact segments 83 and 142 has already been explained, whereby false sequential operation of the two cam groups is prevented. However, further interlocking is necessary to ensure that the cam groups do not stick or hesitate in a position intermediate the actual running notches. For example, if the manipulation of the speed drum causes the switch R1 to be closed, as it does in position *d*, then the cam group which was being actuated at the time might be stopped in an intermediate and undesirable position by reason of the exclusion of the interlock 85—R1—out from the circuit of the cam-group actuating coil. To prevent this, in the case of the actuating coil 99 (*j* to *k*), an interlock or additional contact segment 102 on the cam group #1 is provided.

Consequently, if the switch R1 is closed after the initial energization of the coil 99 (*j* to *k*), then the energizing circuit is transferred from conductor 100 to a circuit comprising contact segment 102 and conductors 103 and 86. Similar action takes place in the case of the other actuating coils through the agency of conductor 101, which is adapted for connecting conductor 84 and contact segment 102, and conductor 105, which is adapted to be connected between the conductor 86 and a contact segment 104 on cam group #2 between positions *k'* and *l*.

We do not wish to be restricted to the specific circuit connections or arrangement of parts herein set forth, as various modifications thereof may be made without departing from the spirit and scope of our invention. We desire, therefore, that only such limitations shall be imposed thereon as are indicated in the appended claims.

We claim as our invention:—

1. In a system of control, the combination with a dynamo-electric machine adapted for both motoring and regeneration, and provided with a plural-part field winding, of means for exciting said field winding during regeneration, means for excluding one part of said field winding from circuit at times during motoring, and a switching device having a single position adapted for governing such exclusion and for controlling said exciting means.

2. In a system of control, the combination with a dynamo-electric machine adapted for both motoring and regeneration, and provided with a plural-part field winding, of means for separately exciting said field winding during one type of operation and for excluding one part of said field winding from circuit at times during the other type of operation, and a switching device having three positions corresponding to strengthening, maintenance and weakening of such excitation, one of said positions being also employed for effecting such exclusion.

3. In a system of control, the combination with a dynamo-electric machine adapted for both motoring and regeneration, and provided with a plural-part field winding, of means for separately exciting said field winding during regeneration and for excluding one part of said field winding from circuit at times during motoring, and a controller having a three-position contact segment for effecting strengthening maintenance and weakening of such excitation and having another segment corresponding to one of such positions for effecting such exclusion.

4. In a system of control, the combination with a plurality of dynamo-electric machines, of means for governing the speed of said machines, and means for changing the grouping of said machines only when the speed-governing means occupies a predetermined operating position and while maintaining a closed machine circuit.

5. In a system of control, the combination with a plurality of dynamo-electric machines, of a plurality of independent speed-governing switches, means for remotely controlling said switches, and means for changing the grouping of said machines, the last-named means being dependent upon the occupation of an operating position by said remote-control means and the consequent condition of certain of said switches.

6. In a system of control, the combination with a plurality of dynamo-electric machines, of a plurality of resistor-short-circuiting switches for governing the speed of said machines during each of a plurality of groupings thereof, and means for changing the grouping of said machines only when a predetermined switch occupies an open position and while maintaining a closed machine circuit.

7. In a system of control, the combination with a plurality of dynamo-electric machines, of a variable resistor for governing the speed of said machines during both series and parallel groupings thereof, and means for changing the grouping of said machines only when a predetermined amount of said resistor is active.

8. In a system of control, the combination with a plurality of dynamo-electric machines, of a multi-position drum for governing the speed of said machines, and a second drum for effecting a change in grouping of said machines only when the speed drum occupies a certain operating position.

9. In a system of control, the combination with a plurality of dynamo-electric machines, of a plurality of speed-governing switches, a multi-position drum for remotely controlling said switches, and means for changing the grouping of said machines, the last-named means being dependent upon movement of said drum to a position adapted to effect the opening of switches corresponding to a relatively low machine speed.

10. In a system of control, the combination with a plurality of dynamo-electric machines, of a plurality of resistor-short-circuiting switches for governing the speed of said machines, and means for changing the grouping of said machines only when a switch corresponding to a relatively high amount of active circuit resistance is open.

11. In a system of control, the combination with a plurality of dynamo-electric machines, of a plural-position drum for effecting a change in the grouping of said machines, and a multi-position drum for effecting a gradual speed increase when moved in one direction and for permitting effective action of said plural-position drum when returned itself toward a relatively low-speed position.

12. In a system of control, the combination with a plurality of dynamo-electric machines, of a plural-position drum for effecting a change in the grouping of said machines, and a multi-position drum for decreasing the active resistance of the machine circuit when moved in one direction and for permitting effective action of said plural-position drum only when returned itself to a position corresponding to a relatively high amount of active circuit resistance.

13. In a system of control, the combination with a supply circuit and a dynamo-electric machine, of means for separately exciting said machine, a resistor initially connected in circuit with said machine to said supply circuit, and means independent of said exciting means and responsive to the direction of flow of machine current for compensatingly regulating such excitation.

14. In a system of control, the combination with a supply circuit and a dynamo-electric machine, of means for separately exciting said machine, a resistor initially connected in circuit with said machine to said supply circuit, and relay means for automatically adjusting such excitation to maintain a substantial balance between the machine and the supply-circuit voltages as said resistor is excluded from circuit.

15. In a system of control, the combination with a supply circuit and a dynamo-electric machine, of means for separately exciting said machine, a resistor initially connected in circuit with said machine to said supply circuit, a manual controller for gradually excluding said resistor from circuit, and means for automatically adjusting such excitation during such period of exclusion to maintain a substantially zero flow of machine current.

16. In a system of control, the combination with a supply circuit and a dynamo-electric machine, of means for separately exciting said machine, a resistor initially connected in circuit with said machine to said supply circuit, a manual controller for gradually excluding said resistor from circuit, and relay means having differentially-related actuating coils respectively energized in accordance with the machine and the supply-circuit voltages for maintaining a substantial equality of said voltages during the period of such exclusion.

17. In a system of control, the combination with a supply circuit and a dynamo-electric machine, of means for separately exciting said machine, a resistor initially connected in circuit with said machine to said supply circuit, means for automatically adjusting such excitation to maintain a substantial balance between the machine and the supply-circuit voltages as said resistor is excluded from circuit, and means for rendering said automatic means ineffective upon the completion of such exclusion.

18. In a system of control, the combination with a supply circuit and a dynamo-electric machine, of means for separately exciting said machine, a resistor initially connected in circuit with said machine to said supply circuit, a manual controller for gradually excluding said resistor from circuit, means for automatically adjusting such excitation during such period of exclusion to maintain a substantially zero flow of machine current, and means for transferring such adjustment from said automatic means to said controller upon the completion of such exclusion.

19. In a system of control, the combination with a supply circuit and a dynamo-electric machine, of means for separately exciting said machine, a resistor initially connected in circuit with said machine to said supply circuit, a manual controller having a plurality of positions for successively excluding resistor sections from circuit, relay means for automatically adjusting such excitation during such exclusion to maintain a substantial balance between the machine and the supply-circuit voltages, and means active after the complete exclusion of said resistor from circuit for transferring such adjustment from said relay means to subsequent positions of said controller.

20. In a system of control, the combination with a plurality of independently controlled dynamo-electric machines, of a plurality of sets of switches to be closed in certain groups for effecting different combinations of said machines, a device for remotely controlling said switches, and means responsive to the movement of one set of switches for preventing the actuation of another set of switches except in the proper order to effect consecutive stages of machine operation.

21. In a system of control, the combination with a plurality of dynamo-electrical machines, of a plurality of independently controlled sets of switches to be closed in certain groups for effecting different speed combinations of said machines, a multi-position drum for controlling said switches, and interlocking means for one of said sets governed in accordance with the movements of another set for ensuring proper sequential operation of said sets of switches to produce consecutive speed stages of said machines.

22. In a system of control, the combination with a plurality of dynamo-electric machines, of a plurality of sets of switches to be closed in certain groups for effecting different combinations of said machines, a device for remotely controlling said switches, and means for preventing the transition from one of said groups to another during a predetermined type of machine operation unless the machines are disconnected.

23. In a system of control, the combination with a plurality of dynamo-electric machines adapted for both acceleration and regeneration, of a plurality of sets of switches to be closed in certain groups for effecting different combinations of said machines, a plural-position drum for controlling said switches, and means for permitting the transition from one of said groups to another during the regenerative period only when the machines are coasting.

24. In a system of control, the combination with a plurality of dynamo-electric machines adapted for both acceleration and regeneration, of means for opening the field circuits to ensure the absence of circulating currents through the machines during regenerative transitions.

25. In a system of control, the combination with a plurality of dynamo-electric machines adapted for both acceleration and regeneration and having plural-section field windings, of a plurality of alternately-employed switches for actively connecting in circuit different amounts of said field windings, and means for opening all such switches to prevent circulating currents during regenerative transitions.

26. In a system of control, the combination with a plurality of dynamo-electric machines adapted for both acceleration and regeneration and having plural-section field windings, of a plurality of alternately-employed switches for actively connecting in circuit different amounts of said field windings, a source of energy for separately exciting said field windings, and means for opening all such switches and disconnecting the machines to prevent the flow of currents during regenerative transitions.

27. In a system of control, the combination with a dynamo-electric machine having a plural-section field winding, of a line switch for said machine, means for initially preventing the closure of said line switch unless the full field winding is connected in circuit, means for subsequently excluding from circuit one section of said field winding, and means for thereupon rendering the control of said line switch dependent upon such exclusion.

28. In a system of control, the combination with a dynamo-electric machine having a plural-section field winding, of a line switch for said machine, a "full-field" switch for connecting the entire field winding in circuit, a "short-field" switch for connecting a portion of the field winding in circuit, means for initially preventing the closure of said line switch while said "full-field" switch is open, means for subsequently closing the "short-field" switch, and means dependent upon such closure for maintaining the closure of the line switch.

29. In a system of control, the combination with a dynamo-electric machine having a plural-section field winding, of a line switch for said machine, a "full-field" switch for connecting the entire field winding in circuit, a "short-field" switch for connecting a portion of the field winding in circuit, all of said switches having actuating coils, an interlock for initially preventing the closure of said line switch until said "full-field" switch is closed, means for subsequently effecting a closed-circuit transition by closing the "short-field" switch prior to the opening of the "full-field" switch, and an interlock on the "short-field" switch for subsequently maintaining the energizing circuit for the line-switch actuating coil by substitution for the first-named interlock.

30. In a system of control, the combination with a plurality of dynamo-electric machines adapted for both acceleration and regeneration, of a plurality of speed-governing switching devices and other switching means governing the opening or closing of the machine circuits, and means for changing the grouping of said machines during one type of operation only when a predetermined switching device occupies an open position and during the other type of operation only when said switching means occupies an open position.

31. In a system of control, the combination with a plurality of dynamo-electric machines adapted for both acceleration and regeneration, of a plurality of speed-governing switching devices and a plurality of switches conjointly in the open position ensuring the opening of the machine circuits, and means for changing the grouping of said machines during motoring operation only when a low-speed switching device occupies an open position and during regeneration only when said switches conjointly occupy open positions.

32. In a system of control, the combination with a plurality of dynamo-electric machines adapted for both acceleration and regeneration, of a plurality of resistor-short-circuiting switches and a plurality of alternately employed switches respectively corresponding to "full-field" and to "short-field" connections of the machines, and means for changing the speed grouping of said machines during motoring operation only when a low-speed resistor-short-circuiting switch is open and during regeneration, only when said "full-field" and said "short-field" switches are both open.

33. In a system of control, the combination with a plurality of dynamo-electric machines adapted for both acceleration and regeneration, of a plural-position drum for effecting a change in the grouping of said machines, a multi-position drum for effecting during motoring a gradual speed increase when moved in one direction and for permitting effective action of said plural-position drum when returned itself toward a relatively low-speed position and for permitting effective action of said plural-position drum during regeneration when returned itself to the "Off" position.

34. In a system of control, the combination with a plurality of dynamo-electric machines adapted for both acceleration and regeneration, of a plural-position drum for effecting a change in the grouping of said machines, a multi-position drum for decreasing during motoring the active resistance of the machine circuit when moved in one direction and for permitting effective action of said plural-position drum when returned itself to a position corresponding to a relatively high amount of active circuit resistance, and for permitting effective action of said plural-position drum during regeneration when returned itself to the "Off" position.

35. In a system of control, the combination with a dynamo-electric machine adapted for both motoring and regeneration and having a field winding, of means for exciting said field winding during regeneration, means for varying the effect of said field winding at times during motoring, and switching means adapted for concurrently governing such variation and for controlling said exciting means.

In testimony whereof, I, ARTHUR J. HALL, have hereunto subscribed my name this 6th day of May, 1920.

ARTHUR JOHN HALL.

In testimony whereof, we, JOHN A. CLARKE, Jr., and PAUL L. MARDIS, have hereunto subscribed our names this 12th day of April, 1920.

JOHN A. CLARKE, JR.
PAUL L. MARDIS.